(12) United States Patent
Helman et al.

(10) Patent No.: US 10,241,679 B2
(45) Date of Patent: *Mar. 26, 2019

(54) MAPPING OF LOGICAL VOLUMES TO HOST CLUSTERS

(71) Applicant: INTERNATIONAL BUSINESS MACHINES CORPORATION, Armonk, NY (US)

(72) Inventors: Haim Helman, Ramat Gan (IL); Omri Palmon, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,599

(22) Filed: Jan. 23, 2018

(65) Prior Publication Data
US 2018/0150227 A1 May 31, 2018

Related U.S. Application Data

(60) Continuation of application No. 15/014,280, filed on Feb. 3, 2016, now Pat. No. 9,910,595, which is a
(Continued)

(51) Int. Cl.
*G06F 3/06* (2006.01)
*H04L 29/08* (2006.01)

(52) U.S. Cl.
CPC ............ *G06F 3/0604* (2013.01); *G06F 3/067* (2013.01); *G06F 3/0622* (2013.01);
(Continued)

(58) Field of Classification Search
CPC ...... G06F 3/067; G06F 3/0665; G06F 3/0604; G06F 3/0629; G06F 3/0605;
(Continued)

(56) References Cited

U.S. PATENT DOCUMENTS 5,822,531 A * 10/1998 Gorczyca .............. G06F 9/5061
709/221
6,343,324 B1 * 1/2002 Hubis .................... G06F 3/0622
709/229
(Continued)

FOREIGN PATENT DOCUMENTS

WO 0120470 A1 3/2001

*Primary Examiner* — David R Lazaro
(74) *Attorney, Agent, or Firm* — Griffiths & Seaton PLLC

(57) ABSTRACT

A method for data storage includes defining a host cluster within a group of host computers, which access a storage system that includes multiple logical volumes. The host cluster includes two or more of the host computers. Responsively to a single mapping instruction, each of the host computers in the host cluster is mapped to access the logical volumes in the set. In another disclosed method, a single control instruction, which specifies the host cluster and a configuration operation to be applied to the host computers in the host cluster, is accepted. Responsively to the single control instruction, the configuration operation is applied to each of the host computers in the host cluster. The configuration operation may comprise assigning a specified level of service to each host computer in one of the first subset of the host computers and the second subset of the host computers.

18 Claims, 2 Drawing Sheets

Related U.S. Application Data continuation of application No. 14/711,066, filed on May 13, 2015, now Pat. No. 9,280,295, which is a continuation of application No. 13/194,742, filed on Jul. 29, 2011, now Pat. No. 9,060,008, which is a division of application No. 12/192,183, filed on Aug. 15, 2008, now Pat. No. 8,055,734.

(52) U.S. Cl.
CPC .......... *G06F 3/0629* (2013.01); *G06F 3/0637* (2013.01); *G06F 3/0665* (2013.01); *G06F 3/0689* (2013.01); *H04L 29/0827* (2013.01); *H04L 29/08144* (2013.01); *H04L 29/08549* (2013.01); *H04L 67/1097* (2013.01); *G06F 2003/0692* (2013.01)

(58) Field of Classification Search
CPC ............... G06F 3/0631; G06F 15/8007; H04L 29/08549; H04L 41/0813; H04L 41/0889; H04L 41/0893; H04L 41/12
See application file for complete search history.

(56) References Cited

U.S. PATENT DOCUMENTS

| | | | |
|---|---|---|---|
| 6,671,776 B1 | 12/2003 | DeKoning | |
| 6,799,255 B1 | 9/2004 | Blumenau et al. | |
| 6,988,130 B2 | 1/2006 | Blumenau et al. | |
| 7,051,101 B1* | 5/2006 | Dubrovsky | H04L 41/022 709/219 |
| 7,574,575 B2* | 8/2009 | Ogasawara | G06F 3/0607 711/162 |
| 7,725,669 B1* | 5/2010 | Bingham | G06F 11/1464 711/161 |
| 8,055,734 B2 | 11/2011 | Helman et al. | |
| 9,060,008 B2 | 6/2015 | Helman et al. | |
| 9,280,295 B2 | 3/2016 | Helman et al. | |
| 9,684,451 B2* | 6/2017 | Helman | G06F 3/0622 |
| 9,910,595 B2* | 3/2018 | Helman | G06F 3/0604 |
| 2002/0073297 A1 | 6/2002 | Mizuno et al. | |
| 2002/0198968 A1* | 12/2002 | Shirriff | H04L 41/0806 709/220 |
| 2003/0037127 A1* | 2/2003 | Shah | G06F 3/0605 709/220 |
| 2003/0158886 A1* | 8/2003 | Walls | G06F 3/14 709/201 |
| 2004/0054866 A1 | 3/2004 | Blumenau et al. | |
| 2005/0097243 A1 | 5/2005 | Yamashita et al. | |
| 2005/0193080 A1* | 9/2005 | Gold | G06F 15/167 709/208 |
| 2005/0268152 A1 | 12/2005 | Yamaguchi et al. | |
| 2006/0047930 A1 | 3/2006 | Takahashi et al. | |
| 2006/0095716 A1* | 5/2006 | Ramesh | G06F 9/30181 712/24 |
| 2006/0190698 A1 | 8/2006 | Mizuno et al. | |
| 2007/0214317 A1 | 9/2007 | Kalos et al. | |
| 2007/0283120 A1 | 12/2007 | Fujita et al. | |
| 2008/0133865 A1* | 6/2008 | Qi | G06F 3/0605 711/170 |
| 2010/0042705 A1* | 2/2010 | Helman | G06F 3/0622 709/221 |
| 2014/0129771 A1 | 5/2014 | Qi et al. | |
| 2018/0150227 A1* | 5/2018 | Helman | G06F 3/0604 |

* cited by examiner

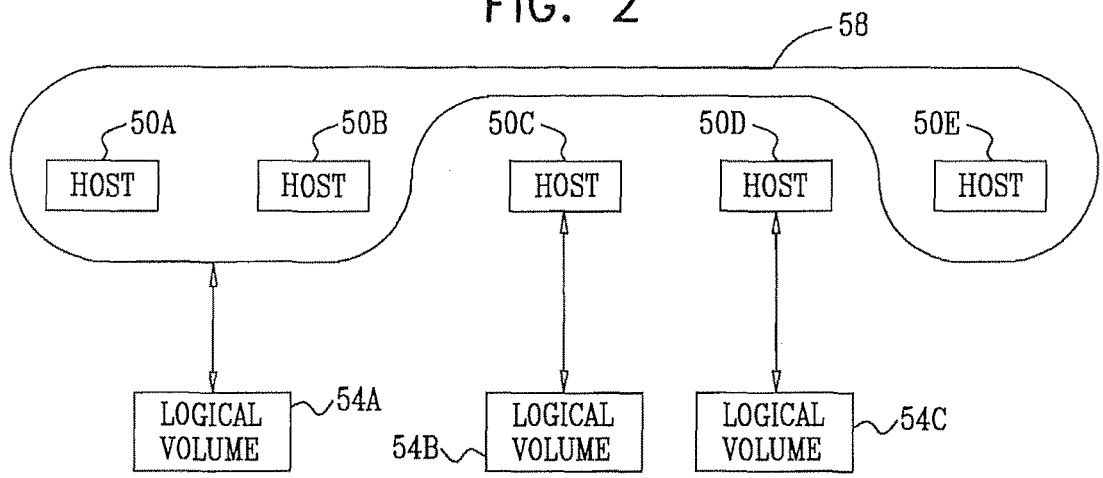
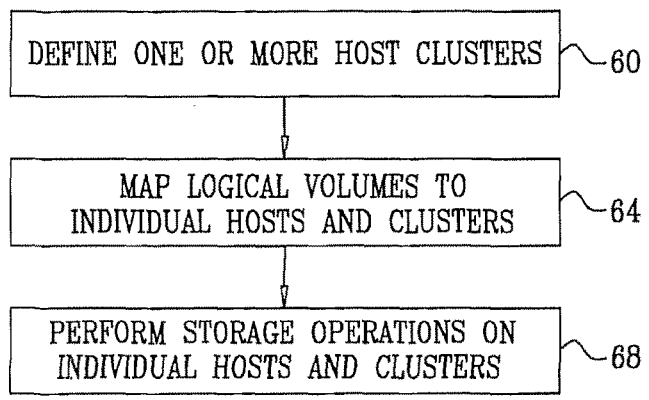

MAPPING OF LOGICAL VOLUMES TO HOST CLUSTERS

CROSS REFERENCE TO RELATED APPLICATIONS

This Application is a Continuation of U.S. patent application Ser. No. 15/014,280, filed on Feb. 3, 2016, which is a Continuation of U.S. patent application Ser. No. 14/711,066, now U.S. Pat. No. 9,280,295, filed on May 13, 2015, which is a Continuation of U.S. patent application Ser. No. 13/194,742, now U.S. Pat. No. 9,060,008, filed on Jul. 29, 2011, which is a Divisional of U.S. patent application Ser. No. 12/192,183, now U.S. Pat. No. 8,055,734, filed on Aug. 15, 2008, each of which is incorporated herein by reference.

BACKGROUND

The present invention relates generally to data storage, and particularly to methods and systems for management of data storage systems.

Data storage systems typically store data on physical media in a manner that is transparent to host computers. From the perspective of a host computer, data is stored at logical addresses located in file systems. Such logical addresses are referred to as logical volumes. Logical volumes are typically configured to store the data required for a specific data processing application. Data storage systems map such logical addresses to addressable physical locations on storage media, such as direct-access hard disks.

System administrators often configure a data storage system by associating hosts with the logical volumes they are intended to use.

BRIEF SUMMARY

An embodiment of the present invention provides a method for data storage. The method includes defining a host cluster within a group of host computers, which access a storage system that includes multiple logical volumes, such that the host cluster includes two or more of the host computers. Responsively to a single mapping instruction, each of the host computers in the host cluster is mapped to access the logical volumes in the set. Apparatus and computer software products are also provided.

In some embodiments, defining the host cluster includes assigning the cluster a respective identifier, the single mapping instruction specifies the host cluster by indicating the identifier, and mapping the host computers to the logical volumes includes extracting the identifier from the instruction so as to identify the host computers in the host cluster. In an embodiment, the identifier comprises a World-Wide Port Name (WWPN) In another embodiment, accepting the single mapping instruction includes accepting the instruction from an administrator.

In a disclosed embodiment, the single mapping instruction specifies access permissions allowing the host computers in the host cluster to access the logical volumes in the set, and mapping the host computers to the logical volumes includes setting the access permissions specified in the instruction. In another embodiment, the one or more logical volumes in the set include respective copies of one or more other logical volumes to which the host computers in the host cluster are mapped, the single mapping instruction includes a re-mapping instruction, and mapping the host computers to the logical volumes includes re-mapping the host computers in the host cluster to access the copies instead of accessing the one or more other logical volumes.

In some embodiments, mapping the host computers to the logical volumes includes communicating with the host computers in the host cluster over a Storage Area Network (SAN). Alternatively, the storage system may be connected to the host computers in a Network-Attached Storage (NAS) configuration.

Another embodiment of the present invention provides another method for data storage. The method includes defining a host cluster within a group of host computers that access a storage system, such that the host cluster includes two or more of the host computers. A single control instruction, which specifies the host cluster and a configuration operation to be applied to the host computers in the host cluster, is accepted. Responsively to the single control instruction, the configuration operation is applied to each of the host computers in the host cluster. Apparatus and computer software products are also provided.

The configuration operation may include an assignment of a specified level of service to the host computers in the host cluster, an assignment of a physical port to the host computers in the host cluster, a monitoring of statistics in the host computers belonging to the host cluster, a verification of redundancy in the host computers belonging to the host cluster, a setting of one or more host attributes in the host computers belonging to the host cluster, and/or a verification of communication paths between the host computers in the host cluster and one or more logical volumes assigned to the host computers in the host cluster.

The present invention will be more fully understood from the following detailed description of the embodiments thereof, taken together with the drawings in which:

BRIEF DESCRIPTION OF THE DRAWINGS

FIG. 2 is a diagram that schematically illustrates a mapping between hosts and logical volumes, in accordance with an embodiment of the present invention; and FIG. 3 is a flow chart that schematically illustrates a method for managing hosts and logical volumes in a data storage system, in accordance with an embodiment of the present invention.

DETAILED DESCRIPTION

Figure 1:
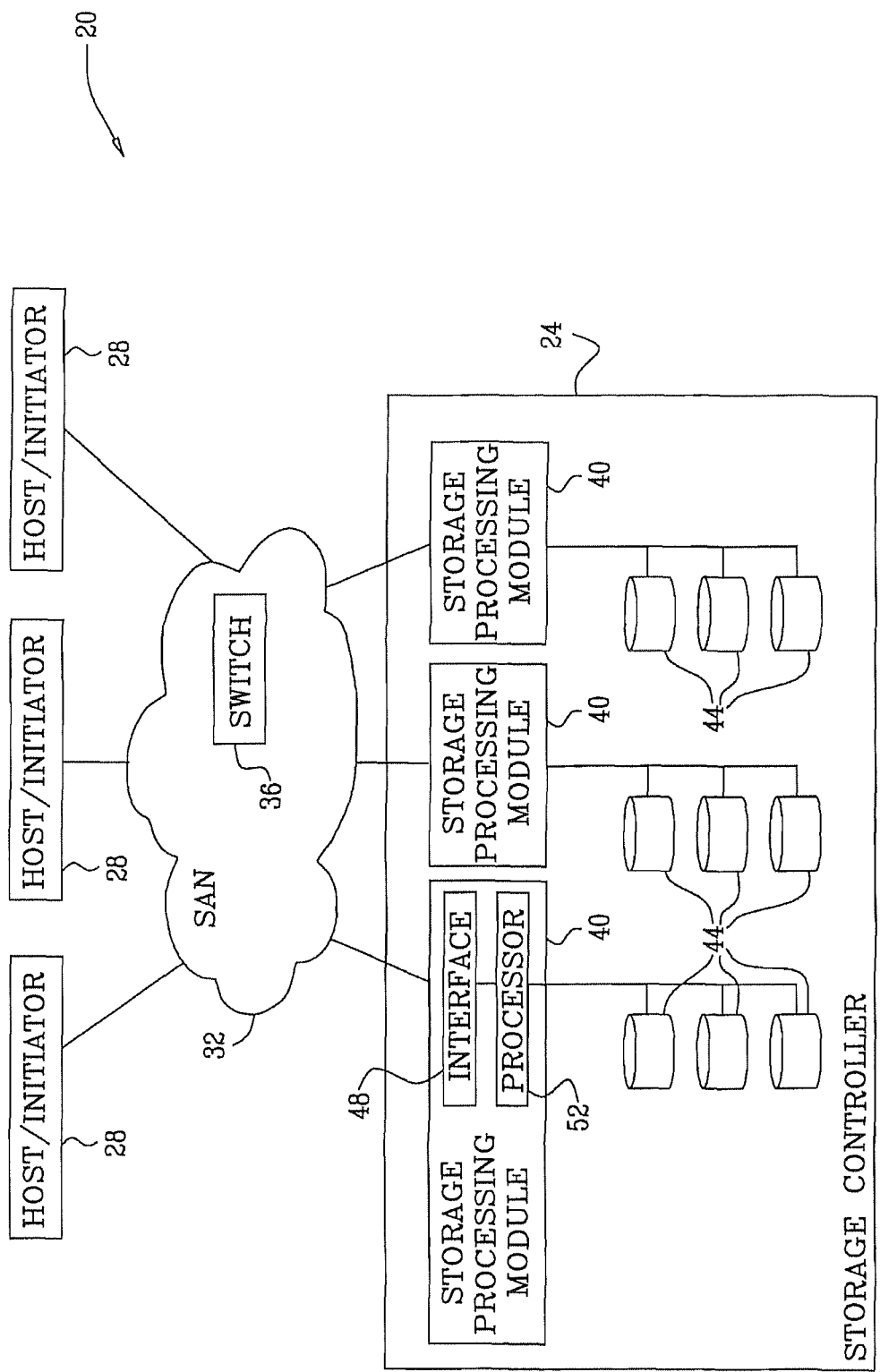
FIG. 1 is a block diagram that schematically illustrates a data storage system, in accordance with an embodiment of the present invention.

Many data storage applications involve large numbers of hosts and logical volumes. It is not uncommon for a data storage system to include hundreds or thousands of hosts, which store data in hundreds or thousands of logical volumes. In systems of this size, management and configuration by an administrator are often highly complex and time-consuming.

For example, an administrator typically defines access permissions for the different logical volumes, i.e., specifies which hosts are permitted to access which logical volumes. As another example, when a logical volume becomes corrupted, an administrator typically has to re-map the hosts that use this volume to access a previous copy ("snapshot") of the corrupted volume. In a large-scale system, these tasks can be extremely time-consuming and error-prone.

Embodiments of the present invention that are described hereinbelow provide improved methods and systems for managing and configuring data storage systems. The methods and systems described herein address the situation in which multiple hosts access a given logical volume or group of volumes. In order to simplify the administrator's configuration tasks, a storage controller supports management commands that address a group of hosts as a single entity.

In some embodiments, a group of two or more hosts is defined as a host cluster and assigned a unique identifier. The storage controller supports management commands for mapping a specified host cluster to a specified logical volume or group of volumes. In response to such a command, the storage controller maps each host in the specified host cluster to the specified logical volume or volume group. Additionally or alternatively, the storage controller may support control commands that modify or otherwise manage the configurations of multiple hosts simultaneously, by addressing the entire host cluster in a single command.

The host clustering techniques described herein enable an administrator to map multiple hosts to a logical volume in a single instruction, instead of performing multiple one-to-one mapping operations. This capability simplifies and shortens the system configuration procedures considerably, both at initial configuration and upon upgrade or reconfiguration of the system. The disclosed techniques also reduce the probability of error associated with performing a large number of repetitive one-to-one mapping operations manually.

FIG. 1 is a block diagram that schematically illustrates a data storage system 20, in accordance with an embodiment of the present invention. System 20 comprises a storage controller 24, which stores and retrieves data for hosts 28. The hosts are also referred to as initiators.

In the configuration of FIG. 1, the hosts are connected to the storage controller via a Storage Area Network (SAN) 32, as is known in the art. The SAN typically comprises one or more network switches 36. The hosts and storage controller may communicate over SAN 32 using any suitable protocol, such as the Small Computer System Interface (SCSI) and/or Fibre-Channel (FC) protocols. Although the embodiment of FIG. 1 refers to a SAN configuration, the hosts and storage controller may be connected using any other suitable configuration, such as a Network-Attached Storage (NAS) or Direct-Attached Storage (DAS) configuration.

Storage controller 24 comprises multiple storage processing modules 40, which store data in multiple storage devices such as disks 44. Storage controller 24 may comprise any desired number of modules 40 and any desired number of disks 44. In a typical configuration, the storage controller may comprise between 1-32 storage processing modules and between 2-2000 disks, although any other suitable numbers can also be used. In the exemplary configuration of FIG. 1, each module 40 stores data in a separate set of disks 44. In alternative embodiments, however, a given disk 44 need not be uniquely associated with a particular module 40. For example, a pool of disks 44 may be common to all modules 40.

Each storage processing module 40 comprises a network interface 48 (e.g., a FC adapter) for communicating with hosts 28 over SAN 32, and a processor 52, which carries out the various storage and retrieval tasks of the module. In particular, processor 52 maps hosts to logical volumes using methods that are described in detail below.

Storage controller 24 stores data on disks 44 by allocating logical volumes to hosts 28, or to specific applications running on the hosts. Each logical volume is typically identified by a unique Logical Unit Number (LUN). From the perspective of the host, the data is written to a logical volume, without knowledge of the underlying physical storage locations in disks 44 in which the data is actually stored.

Typically, each host 28 is assigned one or more logical volumes in controller 24 for storing data. In some cases, a certain host is assigned multiple logical volumes. For example, multiple applications running on the same host may be assigned different logical volumes for storing their data. Additionally or alternatively, a given logical volume may be assigned to multiple hosts. This situation occurs, for example, when using clustered applications such as Oracle Real Application Clusters (RAC).

The assignment of logical volumes to hosts is usually performed by a system administrator. The assignment involves assigning the appropriate volumes to each host, and defining access permissions to the different volumes. In other words, the administrator defines which hosts are permitted to access each logical volume.

As can be appreciated, the complexity of mapping logical volumes to hosts grows with the number of hosts and logical volumes. System 20, however, often comprises large numbers of hosts and logical volumes. It is not uncommon for a data storage system to comprise hundreds or thousands of hosts and hundreds or thousands of logical volumes. In systems of this size, mapping hosts to logical volumes and performing other mapping-related tasks is an extremely complicated, time consuming and error-prone task.

Embodiments of the present invention provide improved methods and systems for mapping hosts to logical volumes. In some embodiments, processor 52 in module 40 performs management tasks collectively on groups of hosts, also referred to as host clusters. In a typical flow, an administrator selects two or more hosts, defines them as a host cluster and provides the cluster definition to processor 52. The host cluster is given a unique identifier. From this stage, processor 52 treats the host cluster similarly to an individual host when performing mapping and configuration tasks.

For example, in some embodiments processor 52 supports commands that map host clusters to logical volumes. In these embodiments, the administrator issues a single mapping command to processor 52, instructing the processor to map a specified logical volume to a specified host cluster that has been defined previously. In response to the command, the processor maps each host in the cluster to the specified logical volume. Thus, all the hosts in the cluster are configured to access the desired logical volume by issuing only a single command to the storage controller.

FIG. 2 is a diagram that schematically illustrates a mapping between hosts and logical volumes, in accordance with an embodiment of the present invention. In the example of FIG. 2, five hosts 50A . . . 50E store data in three logical volumes 54A . . . 54C. Three of the hosts, namely hosts 50A, 50B and 50E, are grouped to form a host cluster 58. The mapping of logical volumes to hosts is defined so that volume 54A is assigned to host cluster 58, volume 54B is assigned to host 50C, and volume 54C is assigned to host 50D. In the present example, each of hosts 50A, 50B and 50E is permitted to access volume 54A. This access permission is configured using only a single mapping command that maps cluster 58 to volume 54A.

The example of FIG. 2 refers to a small-size system having only three logical volumes, five hosts and one host cluster, for the sake of clarity. In practical storage applications, however, the system may comprise any desired number of hosts, logical volumes and host clusters, having any desired mapping between them. A given host may belong to multiple host clusters. Applying host clustering in a system having a large number of hosts simplifies the mapping operation considerably. The host clustering techniques described herein are especially advantageous when a large number of hosts access the same logical volume.

The description above referred to a situation in which a host or host cluster is mapped to an individual logical volume. In some embodiments, however, multiple logical volumes can be grouped to form volume groups. In these embodiments, processor 52 may map a specified volume group to a specified host cluster, such that any host in the cluster is permitted to access any volume in the volume group. This mapping too is performed in a single instruction on the part of the system administrator, once the host cluster and volume group have been defined.

Generally, the administrator may map any desired set of volume groups and/or individual volumes to any desired set of host clusters and/or individual hosts, i.e., intermix one-to-one, one-to-many and many-to-many mapping operations in the same storage system configuration. Any of these mapping operations is performed using a single instruction from the administrator.

Some of the logical volumes in system 20 comprise copies of other volumes, also referred to as snapshots. A snapshot typically comprises a copy of a given logical volume, which is produced at a certain point in time in order to back-up the data in the logical volume against data corruption. System 20 handles snapshots similarly to logical volumes. For example, if a certain logical volume is corrupted, an administrator may modify the mapping of the hosts to the logical volumes, so that the hosts that used the corrupted volume will begin to access a previously created snapshot of the logical volume.

Since snapshots are treated similarly to logical volumes, processor 52 may map a snapshot to a host cluster. For example, if a logical volume that is mapped to a host cluster is corrupted, the host cluster can be re-mapped to a snapshot of the corrupted volume in a single instruction.

FIG. 3 is a flow chart that schematically illustrates a method for managing hosts and logical volumes in a data storage system, in accordance with an embodiment of the present invention. The method begins with an administrator defining one or more host clusters, at a cluster definition step 60. Each host cluster is assigned a unique identifier that enables the system to address it similarly to addressing an individual host. For example, in Fibre-Channel systems, each host is identified by a unique World-Wide Port Name (WWPN). In such systems, the host clusters may be assigned respective unique WWPN values.

In response to administrator commands, processor 52 maps the logical volumes of system 20 to individual hosts and host clusters, at a mapping step 64. In particular, the administrator issues commands for mapping each host cluster to the appropriate volume or volumes. Each mapping operation between a host cluster and a volume or volume group is typically invoked by a single mapping command from the administrator, which specifies the identifier of the host cluster and the LUN of the logical volume or volume group. System 20 may comprise any suitable interface, such as a Command Line Interface (CLI) or Graphical User Interface (GUI) for this purpose. Internally to module 40, processor 52 translates the mapping of a host cluster to a logical volume into a set of individual mapping operations between the volume and the different hosts in the cluster.

System 20 then carries out storage operations for hosts 28, at an operation step 68. The storage operations are performed in accordance with the mapping configured at step 64 above.

The definition of host clusters and the mapping of host clusters to logical volumes can be performed during initial system configuration, upon adding or upgrading hosts, upon modifying the configuration of the storage controller, or at any other stage of the system operation.

In the embodiments described herein, the host clustering and mapping functionality is carried out by processor 52, internally to storage controller 24. In alternative embodiments, however, the methods described herein can be performed by a processor that is separate from the storage controller, such as by an external management station or by a management application running on one of the hosts. Further alternatively, the methods and systems described herein can be performed by any element that is capable of denying or allowing access between a host and a storage device, such as, for example, switches, storage processing modules and Fibre-Channel (FC) adapters.

The use of host clusters can be advantageous in performing any operation that is applicable to multiple hosts. Some of these operations do not necessarily involve direct manipulation of logical volumes. For example, processor 52 may support control commands that address host clusters. Using such commands, multiple hosts belonging to a given cluster can be configured or otherwise managed in a single instruction for the perspective of the administrator. Internally to processor 52, each such command is translated to multiple configuration or management operations that are applied to the individual hosts in the cluster.

Any suitable management command can be defined over host clusters. The command typically specifies a certain host cluster, and a configuration operation to be applied to the hosts in the cluster. Configuration operations may, for example, modify the configuration of the hosts in the addressed cluster, verify the configuration of the hosts in the cluster, or request reporting of information related to the hosts in the cluster. Control commands may thus comprise, for example: a command that assigns a certain level of service (e.g., guaranteed-performance bandwidth) to the hosts in a given cluster, command that assigns a new physical port (e.g., on a FC adapter card) to the hosts in a given cluster, a command that requests monitoring of statistics in the hosts of a given cluster, a command that requests verifying redundancy in the hosts in a given cluster, and/or a command that sets or modifies one or more attributes in the hosts in a given cluster. Attributes may comprise, for example, the Operating System, the OS level or any other suitable attribute. A command requesting to verify that communication paths exist between the hosts in a given cluster and the logical volumes assigned to the hosts. Typically but not necessarily, this command is implemented in the FC adapters located inside modules 40. The FC adapters are typically provided with a list of mappings between hosts and logical volumes for verification.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

Although the embodiments described above mainly address SAN configurations, the methods and systems described herein can also be used for configuring or otherwise managing groups of hosts in Network-Attached Storage (NAS) configurations.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for storing data in a distributed network comprising a plurality of host computers in communication with a data storage system comprising a plurality of logical volumes including a first subset of the logical volumes, the plurality of host computers including a first subset of host computers including at least a first host computer and a second subset of host computers including the first host computer and a second host computer that is not included in the first subset of host computers such that the first host computer is included in both the first subset of host computers and the second subset of host computers, said method comprising:

in response to receiving a single first mapping instruction, mapping, by a processor, each host computer in the one of the first subset of host computers and the second subset of host computers to each logical volume in the first subset of the logical volumes; and receiving, by the processor, a single management command for performing a configuration operation on one of the first subset of the host computers and on the second subset of the host computers; wherein the configuration operation comprises assigning a specified level of service to each host computer in one of the first subset of the host computers and the second subset of the host computers.

2. The method of claim 1, wherein the plurality of logical volumes includes a second subset of the logical volumes and wherein the single first mapping instruction specifies the first subset of the host computers and the processor maps each host computer in the first subset of the host computers to each logical volume in the first subset of the logical volumes, the method further comprising:
receiving a single second mapping instruction that specifies the second subset of the host computers and the second subset of the logical volumes; and
responsively to receiving the single second mapping instruction, mapping, by the processor, each host computer in the second subset of the host computers to each logical volume in the second subset of the logical volumes.

3. The method of claim 1, further comprising, responsively to receiving the single management command, performing, by the processor, the configuration operation on each host computer in one of the first subset of the host computers and the second subset of the host computers.

4. The method of claim 3, wherein the configuration operation comprises assigning a new physical port to each host computer in one of the first subset of the host computers and the second subset of the host computers.

5. The method of claim 3, wherein the configuration operation comprises verifying redundancy for each host computer in one of the first subset of the host computers and the second subset of the host computers.

6. The method of claim 3, wherein the configuration operation comprises verifying communication paths between each logical volume in the first subset of the logical volumes and each host computer in one of the first subset of the host computers and the second subset of the host computers.

7. A distributed network for storing data, comprising:
a data storage system comprising a plurality of logical volumes including a first subset of the logical volumes;
a plurality of host computers in communication with the data storage system, the plurality of host computers including a first subset of host computers including at least a first host computer and a second subset of host computers including the first host computer and a second host computer that is not included in the first subset of host computers such that the first host computer is included in both the first subset of host computers and the second subset of host computers; and
a processor in communication with the data storage system and the plurality of host computers, the processor configured for:
in response to receiving a single first mapping instruction, mapping, by a processor, each host computer in the one of the first subset of host computers and the second subset of host computers to each logical volume in the first subset of the logical volumes; and
receiving a single management command for performing a configuration operation on one of the first subset of the host computers and on the second subset of the host computers; wherein, when performing the configuration operation, the processor is configured for assigning a specified level of service to each host computer in one of the first subset of the host computers and the second subset of the host computers.

8. The distributed network of claim 7, wherein the plurality of logical volumes includes a second subset of the logical volumes and wherein the single first mapping instruction specifies the first subset of the host computers and the processor maps each host computer in the first subset of the host computers to each logical volume in the first subset of the logical volumes, the processor further configured for:
receiving a single second mapping instruction that specifies the second subset of the host computers and the second subset of the logical volumes; and
responsively to receiving the single second mapping instruction, mapping, by the processor, each host computer in the second subset of the host computers to each logical volume in the second subset of the logical volumes.

9. The distributed network of claim 7, wherein the processor is further configured for, responsively to receiving the single management command, performing, by the processor, the configuration operation on each host computer in one of the first subset of the host computers and the second subset of the host computers.

10. The distributed network of claim 9, wherein, when performing the configuration operation, the processor is configured for assigning a new physical port to each host computer in one of the first subset of the host computers and the second subset of the host computers.

11. The distributed network of claim 9, wherein, when performing the configuration operation, the processor is configured for verifying redundancy for each host computer in one of the first subset of the host computers and the second subset of the host computers.

12. The distributed network of claim 9, wherein, when performing the configuration operation, the processor is configured for verifying communication paths between each logical volume in the first subset of the logical volumes and each host computer in one of the first subset of the host computers and the second subset of the host computers.

13. A computer program product comprising a computer-useable memory including computer-readable program code embodied therein for storing data in a distributed network comprising a plurality of host computers in communication with a data storage system comprising a plurality of logical volumes including a first subset of the logical volumes, the plurality of host computers including a first subset of host computers including at least a first host computer and a second subset of host computers including the first host computer and a second host computer that is not included in the first subset of host computers such that the first host computer is included in both the first subset of host computers and the second subset of host computers, the computer program product comprising:
computer code for mapping, by a processor in response to receiving a single first mapping instruction, each host computer in the one of the first subset of host computers and the second subset of host computers to each logical volume in the first subset of the logical volumes; and
computer code for receiving, by the processor, a single management command for performing a configuration operation on one of the first subset of the host computers and on the second subset of the host computers; wherein the configuration operation comprises computer code for assigning a specified level of service to each host computer in one of the first subset of the host computers and the second subset of the host computers.

14. The computer program product of claim 13, wherein the plurality of logical volumes includes a second subset of the logical volumes and wherein the single first mapping instruction specifies the first subset of the host computers and the processor maps each host computer in the first subset of the host computers to each logical volume in the first subset of the logical volumes, the computer program product further comprising:
   computer code for receiving a single second mapping instruction that specifies the second subset of the host computers and the second subset of the logical volumes; and
   computer code for mapping, by the processor in response to receiving the single second mapping instruction, each host computer in the second subset of the host computers to each logical volume in the second subset of the logical volumes.

15. The computer program product of claim 13, further comprising computer code for performing, by the processor in response to receiving the single management command, the configuration operation on each host computer in one of the first subset of the host computers and the second subset of the host computers.

16. The computer program product of claim 15, wherein the configuration operation comprises computer code for assigning a new physical port to each host computer in one of the first subset of the host computers and the second subset of the host computers.

17. The computer program product of claim 15, wherein the configuration operation comprises computer code for verifying redundancy for each host computer in one of the first subset of the host computers and the second subset of the host computers.

18. The computer program product of claim 15, wherein the configuration operation comprises computer code for verifying communication paths between each logical volume in the first subset of the logical volumes and each host computer in one of the first subset of the host computers and the second subset of the host computers.

* * * * *